(12) United States Patent
Kim et al.

(10) Patent No.: US 9,581,220 B2
(45) Date of Patent: Feb. 28, 2017

(54) SEPARABLE ACTUATOR (71) Applicant: ROBOTIS CO., LTD., Seoul (KR)

(72) Inventors: Byoung-Soo Kim, Seoul (KR); Jung-Ho Lee, Gyeonggi-do (KR)

(73) Assignee: ROBOTIS CO., LTD., Seoul (KR)

( * ) Notice: Subject to any disclaimer, the term of this patent is extended or adjusted under 35 U.S.C. 154(b) by 281 days.

(21) Appl. No.: 14/354,564

(22) PCT Filed: Oct. 26, 2012

(86) PCT No.: PCT/KR2012/008902
§ 371 (c)(1),
(2) Date: Apr. 26, 2014

(87) PCT Pub. No.: WO2013/062376
PCT Pub. Date: May 2, 2013

(65) Prior Publication Data
US 2014/0298939 A1 Oct. 9, 2014

(30) Foreign Application Priority Data

Oct. 26, 2011 (KR) .......................... 10-2011-0110070

(51) Int. Cl.
*F16H 57/10* (2006.01)
*F16H 1/20* (2006.01)
*B25J 9/10* (2006.01)
*F16H 35/00* (2006.01)
*B25J 9/12* (2006.01)
*F16H 37/04* (2006.01)
(Continued)

(52) U.S. Cl.
CPC ............... *F16H 1/20* (2013.01); *B25J 9/1025* (2013.01); *B25J 9/126* (2013.01); *F16H 35/00* (2013.01); *F16H 37/041* (2013.01); *H02K 7/116* (2013.01); *H02K 11/30* (2016.01); *F16H 1/32* (2013.01); *Y10T 74/19637* (2015.01)

(58) Field of Classification Search
CPC ........ F16H 35/00; F16H 37/041; H02K 11/30; H02K 7/116
See application file for complete search history.

(56) References Cited

FOREIGN PATENT DOCUMENTS

| KR | 20-0325018 Y1 | 8/2003 |
|----|---------------|--------|
| KR | 10-0454333 B1 | 10/2004 |
| KR | 20-2008-0001537 U | 6/2008 |

(Continued)

OTHER PUBLICATIONS

International Search Report for PCT/KR2012/008902.

*Primary Examiner* — William Kelleher
*Assistant Examiner* — Zakaria Elahmadi
(74) *Attorney, Agent, or Firm* — Revolution IP, PLLC (57) ABSTRACT

An actuator for controlling joint movement of a robot includes a first deceleration module and a second deceleration module, which receives and outputs driving force by being in gear with the first deceleration module. The first deceleration module includes a driving motor, a first print circuit board for controlling the driving motor by feeding back the output of the second deceleration module, at least one first reduction gear which is rotated by a driving motor, and a housing on which the driving motor, the first print circuit board, and the first reduction gear are mounted. The second deceleration module includes at least one other reduction gear, which rotates by being in gear with the first reduction gear, and a case on which the second reduction gear is mounted and which is connected to the housing.

14 Claims, 10 Drawing Sheets

(51) Int. Cl.
*H02K 7/116* (2006.01)
*F16H 1/32* (2006.01)

(56) References Cited

FOREIGN PATENT DOCUMENTS

| KR | 10-2010-0038146 A | 4/2010 |
| KR | 10-2011-0068500 A | 6/2011 |

SEPARABLE ACTUATOR

CROSS REFERENCE TO RELATED APPLICATIONS AND CLAIM OF PRIORITY

This patent application is a National Phase application under 35 U.S.C. §371 of International Application No. PCT/KR2012/008902, filed Oct. 26, 2012, which claims priority to Korean Patent Application No. 10-2011-0110070 filed Oct. 26, 2011, entire contents of which are incorporated herein by reference.

BACKGROUND

1. Field of the Invention

The present invention relates to an actuator for controlling motion.

2. Description of the Related Art

Robots, from industrial robots to humanoid robots, are widely used and can perform flexible articulated motions through actuators having a deceleration function.

In particular, within the robotics industry, which has rapidly developed in recent times, robotics mechanisms that have only been used in specific industrial fields are also being applied to broader industrial fields leading to a convergence of technologies. For example, home cleaning robots, programmable education robots, robot toys, entertainment robots, and so on, are being further developed and produced.

An actuator related to driving within robot technology is a very important part. Further, a major component that constitutes the actuator may be a decelerator. Various kinds of decelerators such as a gear-type decelerator, a rolling ball-type decelerator, a cycloid decelerator, and so on, may be used as the decelerator.

Here, the gear-type decelerator, which is a widely used general decelerator, is a decelerator using an involute tooth form; the rolling ball-type decelerator is a decelerator in which a ball rolls in a guide groove having an epicycloid curve and a hypocycloid curve facing each other to perform deceleration rotation; a harmonic drive decelerator is a decelerator in which, when an oval wave generator assembly is rotated, an elliptically moving portion is transmitted to a flexspline by an elliptically revolving bearing and the flexspline is slowly rotated while skipping the outermost ring gear to induce deceleration; and the cycloid decelerator is a decelerator in which a trochoid gear serving as a planetary gear is eccentrically rotated while fixing a pin, and only the trochoid gear is rotated by a pinhole and the pin disposed in a trochoid at the same angular interval to obtain deceleration rotation.

Among these, in particular, since the cycloid decelerator can implement various deceleration ratios and is advantageous for high precision and high deceleration, the cycloid decelerator is widely used in fields that require precise control. Related technologies of the decelerator are disclosed in Korean Utility Model Registration No. 0325018 and Korean Patent Laid-open Publication Nos. 2010-0038146 and 2011-0068500.

However, considering the various decelerators including the above-mentioned related technologies, since the deceleration gear is installed in one housing, the size of the decelerator is increased and a user cannot easily set the deceleration ratio. In addition, the user cannot flexibly select his/her requirements (e.g., a center distance, a gear-type, a gear ratio, and the like).

SUMMARY

In one embodiment, provided is a separable actuator module capable of being modularized as a primary deceleration module and a secondary deceleration module to enable flexible selection.

In another embodiment, provided is a separable actuator module capable of providing various applications according to the needs of a user through a high degree of freedom, expandability, and compatibility.

In yet another embodiment, provided is a separable actuator configured to control an articulated motion of a robot, including a primary deceleration module, and a secondary deceleration module meshed with the primary deceleration module to receive and output power, wherein the primary deceleration module includes a first printed circuit board configured to feed back output of a driving motor and the secondary deceleration module to control the driving motor, one or more primary deceleration gears rotated by the driving motor, and a housing in which the driving motor, the first printed circuit board, and the primary deceleration gears are mounted, and the secondary deceleration module includes one or more secondary deceleration gears meshed and rotated with the primary deceleration gears, and wherein the secondary deceleration gears are mounted and connected to the housing.

The primary deceleration gears may include a driving gear fixed to a rotary shaft of the driving motor; a driven gear meshed with the driving gear; and a transmission gear installed on the same shaft of the driven gear to be rotated with the driven gear and meshed with the secondary deceleration gears.

The secondary deceleration module may be any one of a gear-type decelerator having an involute tooth form, a rolling ball-type decelerator, a harmonic drive decelerator, and a cycloid decelerator.

The secondary deceleration module may further include a position detector configured to detect the output and convert the output into an electrical signal and transmit the electrical signal, and the position detector may be any one of a magnetic absolute encoder, a potentiometer, and an optical rotary absolute encoder.

The housing and the case may have a plurality of bolt holes formed at preset intervals, and the bolt holes may form a rectangular shape to form a unit lattice.

The separable actuator may further include one or more positioning pins inserted into the bolt hole to fasten the housing and the case.

The secondary deceleration gears may include a plurality of pin gears protruding from an inner circumferential surface of a mounting space of the case to be formed along the inner circumferential surface; an input gear meshed and rotated with the primary deceleration gears; a first and a second eccentric shafts, eccentric from a rotational center of the input gear and sequentially protruding from the input gear; and a first and a second plate gears installed on the first and second eccentric shafts and configured to come in contact with the pin gears to be rotated therewith according to rotation of the first and second eccentric shafts, respectively, and the separable actuator may further include an output member fixed to the plate gear and rotated with the plate gear.

The separable actuator may further include a position detector configured to detect rotation of the output member and convert the detected result into an electrical signal to transmit the electrical signal, wherein the position detector is any one of a magnetic absolute encoder, a potentiometer, and an optical rotary absolute encoder.

The position detector may include a rotary rod sequentially passing through the input gear, the first and second eccentric shafts, and the first and second plate gears, and having one end fixed to an output shaft installed at a center of the output member to be rotated with the output shaft; a magnet fixed to the other end of the rotary rod; and a second printed circuit board spaced apart from the magnet and in which a magnetic encoder configured to detect rotation of the magnet is mounted.

The position detector may further include a rod housing installed at a center of an input side of the case; and a bearing inserted into the rod housing to support the rotary rod.

The position detector may include a rotary rod sequentially passing through the input gear, the first and second eccentric shafts, and the first and second plate gears, and having one end fixed to an output shaft installed at a center of the output member and rotated with the output shaft; a printed circuit board spaced apart from the rotary rod; and an encoder mounted in the printed circuit board and coupled to a lower end of the rotary rod, and configured to detect rotation of the rotary rod.

The first and second eccentric shafts may be eccentric in opposite directions.

The number of teeth of the pin gears may be larger than that of the first and second plate gears.

The case may further have a bearing groove recessed along the inner circumferential surface and disposed at an output side of the pin gears, and the secondary deceleration module may further include a bearing inserted into the bearing groove to support the output member.

According to the embodiments above, the separable actuator module is modularized into the primary deceleration module and the secondary deceleration module to enable flexible selection by a user. In addition, various applications are possible according to the needs of the user via a high degree of freedom, expandability, and compatibility.

DETAILED DESCRIPTION OF EXEMPLARY EMBODIMENTS

Hereinafter, an exemplary embodiment of the present invention will be described with reference to FIGS. 1 to 3. The embodiment of the present invention may be modified in various types, and the scope of the present invention should not be limited to the embodiments to be described below. The embodiments are provided to describe the present invention to those skilled in the art in detail. Accordingly, shapes of elements shown in the drawings may be exaggerated to emphasize clearer description thereof.

Figure 1:
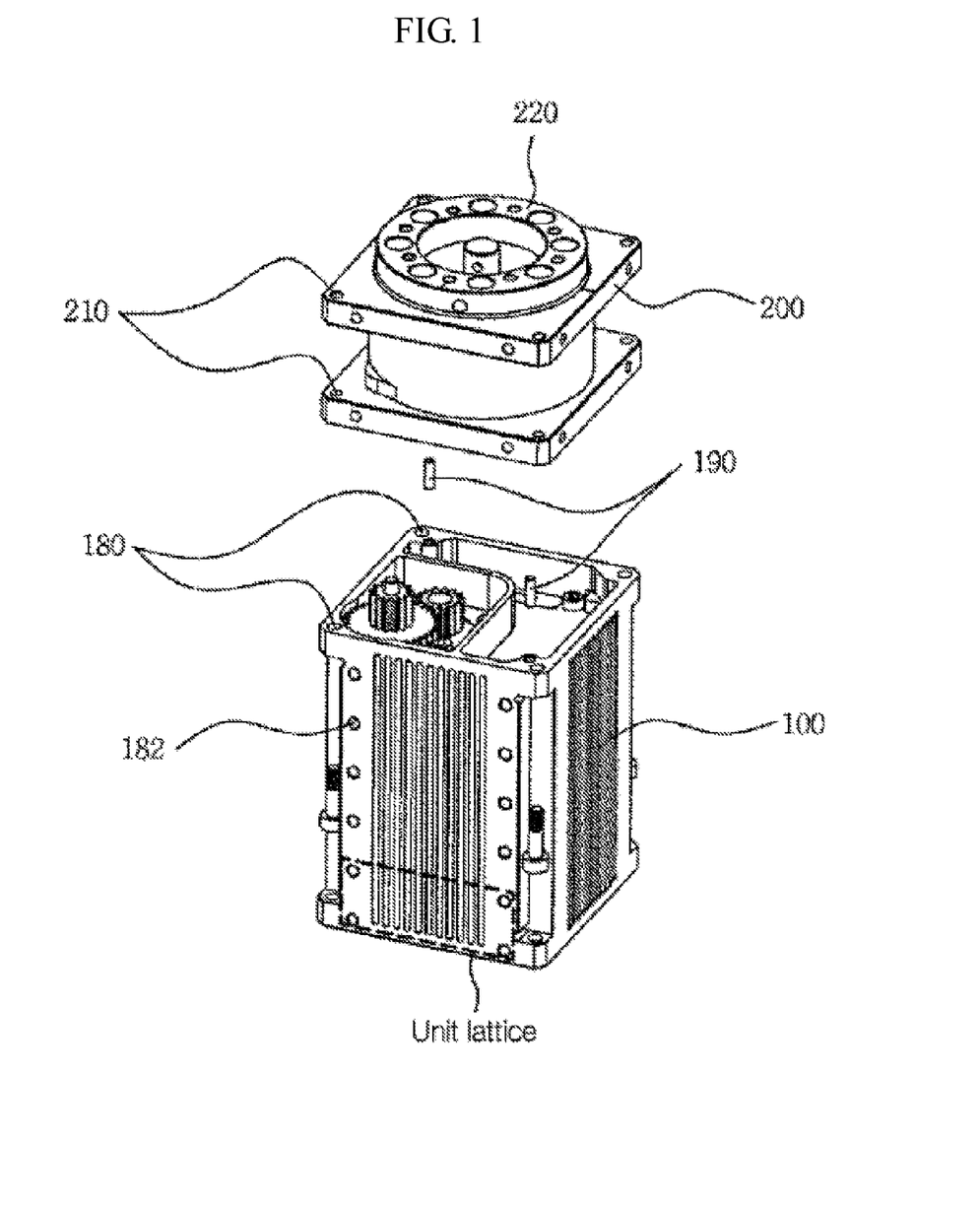
FIG. 1 is an exploded perspective view of a separable actuator according to an embodiment of the present invention.

As shown in FIG. 1, a separable actuator according to the present invention includes a primary deceleration module 100 and a secondary deceleration module 200.

Here, the primary deceleration module 100 may be commonly used and the plurality of secondary deceleration modules 200 are configured to provide various deceleration ratios in order to implement the various deceleration ratios and degrees of freedom. Further, when the plurality of primary deceleration modules 100 are provided, the number of sets is exponentially increased such that the deceleration ratio and the degrees of freedom can be extensively varied.

In addition, as the secondary deceleration module 200, a gear-type decelerator using an involute tooth form; a rolling ball-type decelerator in which a ball rolls in a guide groove having an epicycloid curve and a hypocycloid curve facing each other to perform deceleration rotation; a harmonic drive decelerator in which, when an oval wave generator assembly is rotated, an elliptically moving portion is transmitted to a flexspline by an elliptically revolving bearing and the flexspline is slowly rotated while skipping the outermost ring gear to induce deceleration; and a cycloid decelerator in which a trochoid gear serving as a planetary gear is eccentrically rotated while fixing a pin, and only the trochoid gear is rotated by a pinhole and the pin disposed in a trochoid at the same angle interval to obtain deceleration rotation, may be used. In addition, decelerators assembled by combining, without limitation, the above-mentioned decelerators may also be used.

Figure 2:
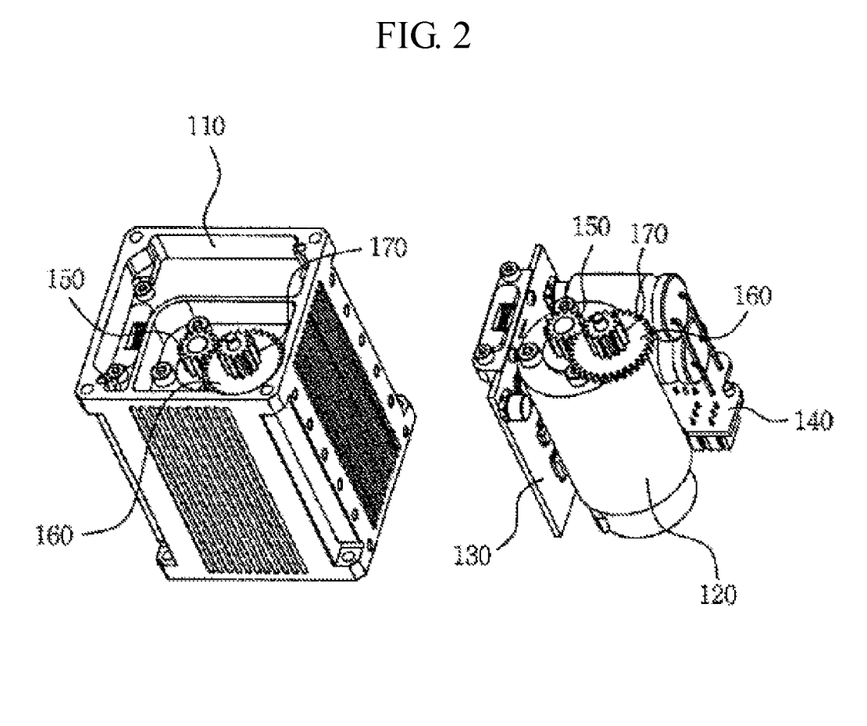
FIG. 2 is a view schematically showing a primary deceleration module shown in FIG. 1.

In particular, as shown in FIGS. 1 and 2, the primary deceleration module 100 is configured to primarily decelerate power of a driving motor 120, which is input from the primary deceleration module 100, according to a gear ratio.

For this, the primary deceleration module 100 includes a module housing 110, the driving motor 120 installed in the module housing 110, a main printed circuit board (PCB) 130 configured to control power supply and cutoff, and communication with the primary deceleration module 100, a sub-PCB 140 configured to receive feedback of a position of an output shaft and control driving of the driving motor 120, a driving gear 150 fixed to a rotary shaft of the driving motor 120, a driven gear 160 meshed with the driving gear 150 to induce primary deceleration, and a transmission gear 170 integrally formed with the driven gear 160 and configured to transmit power to the secondary deceleration module 200.

In one embodiment, the driving gear 150 and the driven gear 160 that constitute a deceleration unit may be a spur gear-type, a harmonic gear, or a combination thereof. The spur gear-type is a conventional spur gear-type, and the harmonic gear is known to have reduced backlash than other gear-types, and may be applied to a robot that requires precise control.

In addition, since an output shaft of the primary deceleration module 100 is meshed with an input shaft of the secondary deceleration module 200, through spur gear engagement, and a deceleration function (i.e., spur gear engagement) at a connecting section between the primary deceleration module 100 and the secondary deceleration module 200, i.e., intermediate deceleration, is further performed in addition to a primary deceleration function by a primary decelerator (i.e., a driving gear+a driven gear), installed at the primary deceleration module 100, and a secondary deceleration function by a secondary decelerator, installed at the secondary deceleration module 200, deceleration efficiency is further increased.

Moreover, while not shown, a position detector such as a magnetic absolute encoder, a potentiometer, an optical rotary absolute encoder, or the like, configured to detect a position of the secondary output shaft to feed the detected position back to the PCB, is further installed at the secondary deceleration module 200.

As shown in FIG. 1, the actuator deceleration module has four coupling holes 180 with tabs formed at a coupling surface of the primary deceleration module 100, that may be in a rectangular shape, and a plurality of coupling apertures 210 with tabs formed at a coupling surface of the secondary deceleration module 200 to couple the primary deceleration module 100 and the secondary deceleration module 200.

Moreover, a plurality of unit lattice-type bolt holes 182 are formed in at least one surface of the primary and secondary deceleration modules 100 and 200 by a multitude of unit lattices to increase expandability. The unit lattice-type bolt holes 182 are constituted by at least four bolt holes disposed to form a substantially rectangular shape at predetermined intervals to define a basic lattice as a unit lattice, and a plurality of other bolt holes are formed based on the unit lattice by a multitude of unit lattices.

In other words, the bolt holes have a structure in which a plurality of unit lattices are repeated, and thus a plurality of primary deceleration modules having different sizes may be connected to increase the volume thereof, i.e., increase expandability. Accordingly, the size (i.e., volume) of the actuator module can be increased or decreased in proportion to the unit lattice according to the needs of a user.

The present invention allows a user to arbitrarily vary the volume because the modules are modularized by a multitude of unit lattices. In particular, as shown in FIG. 1, when a positioning pin 190 is further installed at an arbitrary position of the coupling surfaces of the first and secondary modules 100 and 200, the assembly can be performed rapidly, smoothly, and more precisely in shorter time periods.

Moreover, an output member 220 installed at the secondary deceleration module 200 is a member configured to output decelerated power, which is formed of a conventional shaft. Since the output member 220 should be assembled to a shaft by a coupling or a key engagement to use the decelerated power, the assembly is very inconvenient. However, in the present invention, since the decelerated power can be used when the member is exchanged with a flange, and a plurality of bolt holes (reference numerals are omitted) are formed within the flange surface, so that the decelerated power can be used when the bolt is simply fastened, whereby this embodiment enhances the convenience of use.

Figure 3:
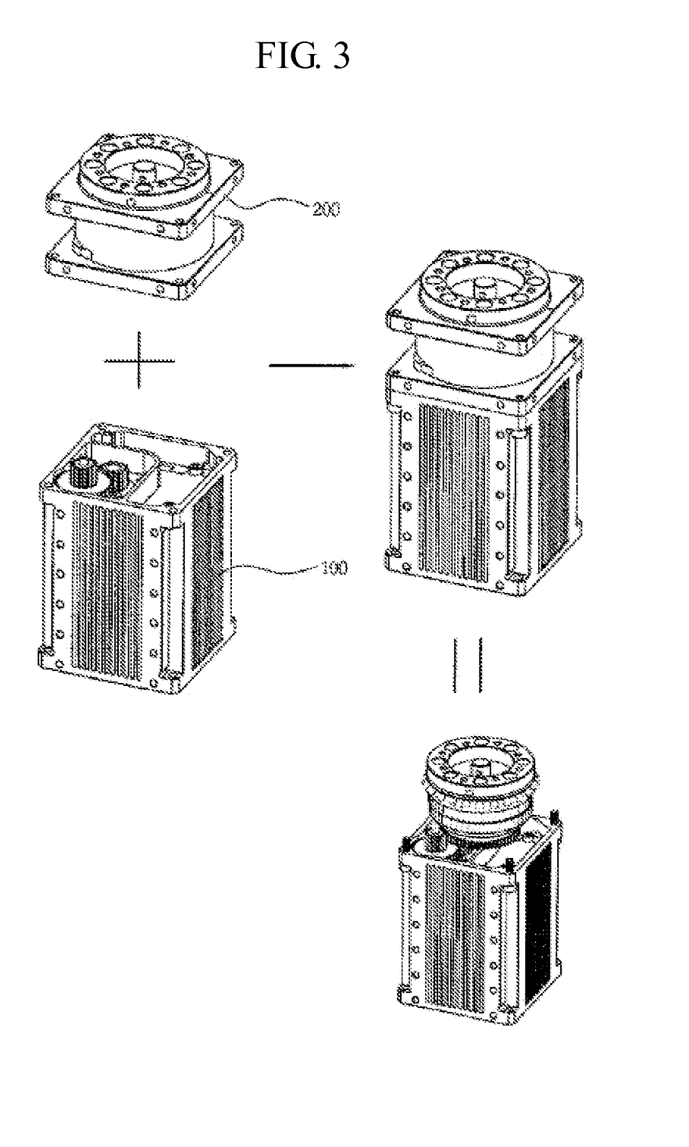
FIG. 3 is a view showing assembly of the separable actuator shown in FIG. 1.

The actuator module as shown in FIG. 3 can be implemented based on the above-mentioned concept. For example, FIG. 3 shows a general instance wherein the input shaft and the output shaft configured to apply power are maintained in parallel when the primary deceleration module 100 and the secondary deceleration module 200 are assembled.

As described above, the actuator module can also continuously perform secondary deceleration through the secondary deceleration module 200, while performing a primary deceleration function through the primary deceleration module 100, and thus can be applied to a field that requires more precise and accurate control. Since the actuator module is constituted by standardized modules, the actuator can be freely expanded and reduced, exchanged with a new combination to have a desired deceleration ratio according to the environment of a user, and maximize the degrees of freedom of the user.

While the present invention has been described with reference to the exemplary embodiment above in detail, different types of embodiments are also possible. Accordingly, the technical spirit and scope of the claims described below are not limited to the exemplary embodiment.

Hereinafter, another exemplary embodiment of the present invention will be described with reference to FIGS. 1 to 3. Accordingly, the shapes of the elements shown in the drawings may be exaggerated to emphasize a clearer description thereof. Hereinafter, contents distinguished from the above-mentioned embodiment will be described, and description omitted below will be replaced with the above-mentioned description.

Figure 4:
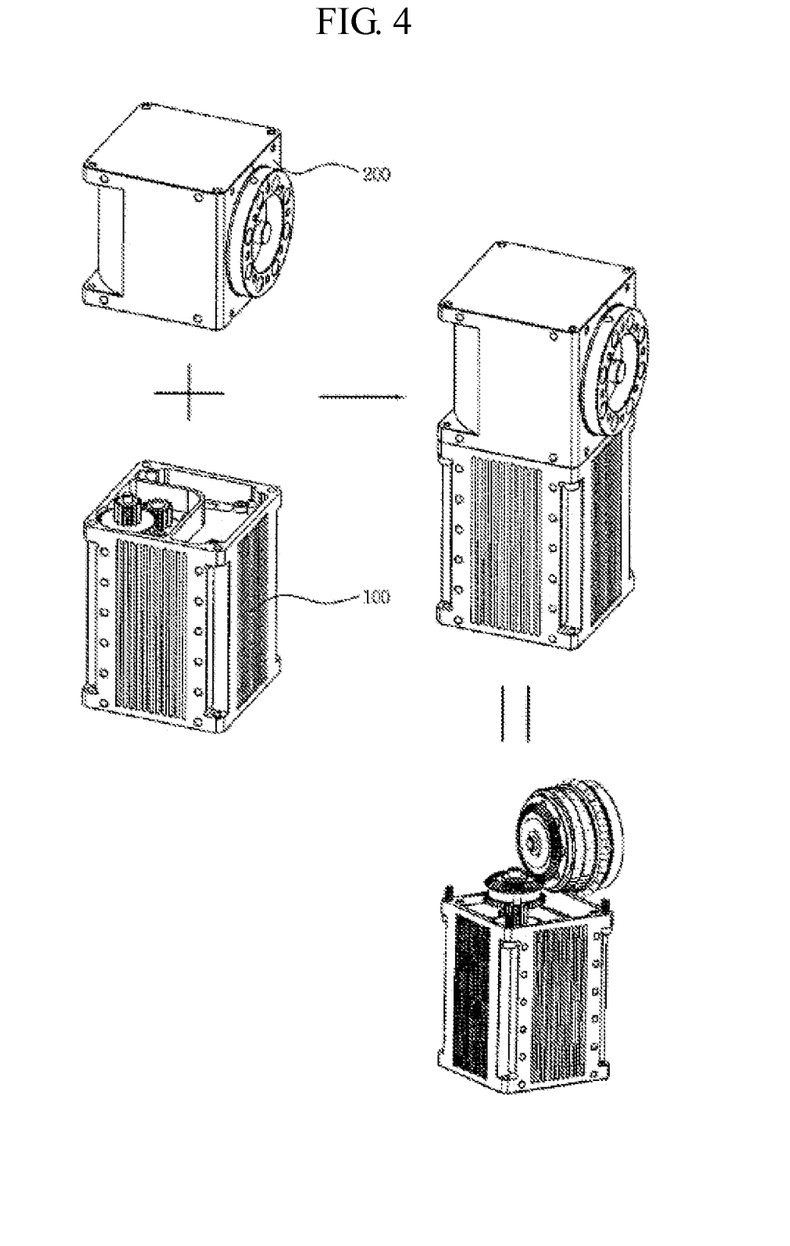
FIG. 4 is a view showing assembly of a separable actuator according to another embodiment of the present invention.

FIG. 4 shows an embodiment wherein the input shaft and the output shaft are perpendicularly maintained when the primary deceleration module 100 and the secondary deceleration module 200 are perpendicularly assembled.

The secondary deceleration module is a decelerator in which an internal gear having an epitrochoid tooth form is used. A pin gear 110 and a plate gear 300, to be described below (see FIG. 6), may have an epitrochoid tooth form, but may also have an involute tooth form.

Figure 5:
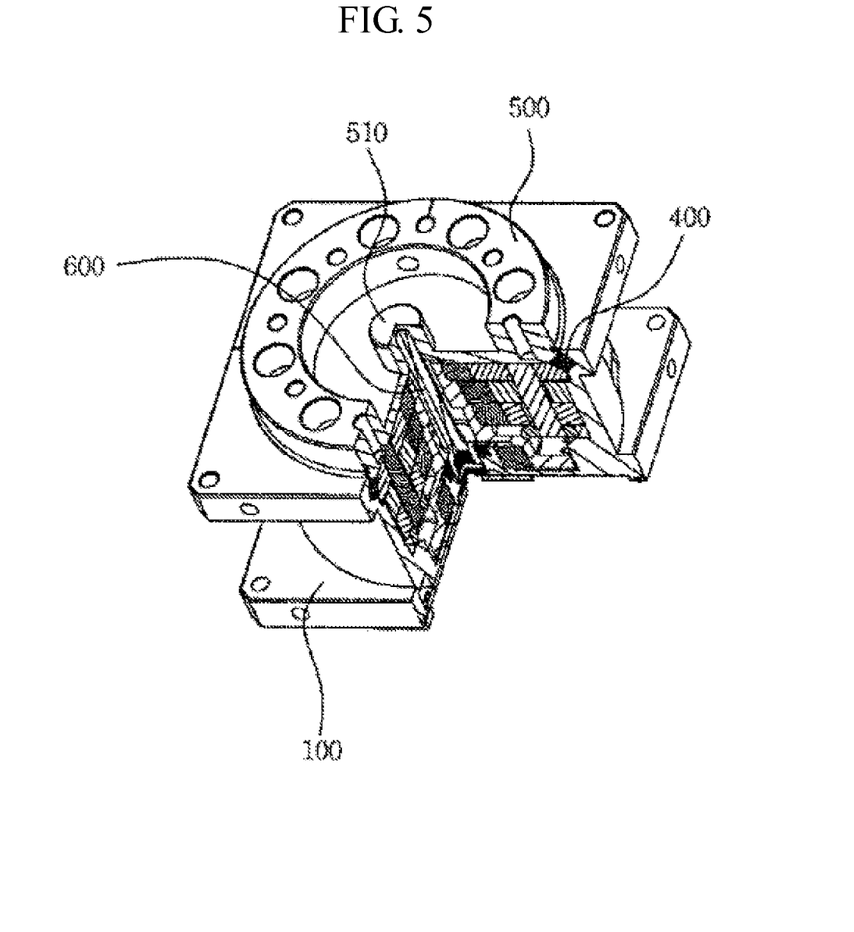
FIG. 5 is a cut-away perspective schematically showing the secondary deceleration module shown in FIG. 1.
Figure 6:
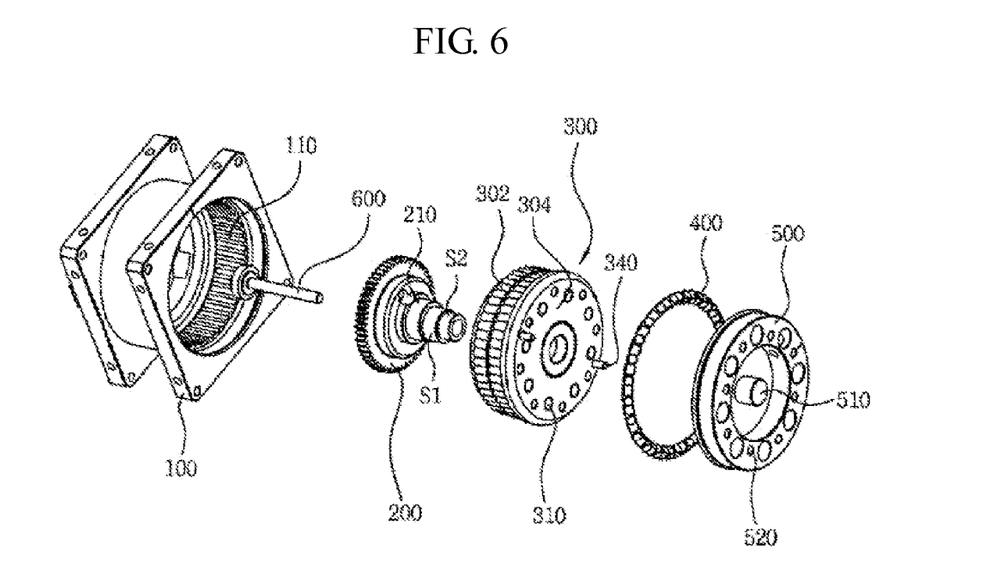
FIG. 6 is an exploded perspective view of a secondary deceleration module shown in FIG. 5.

As shown in FIGS. 5 and 6, a case 100 has a cylindrical mounting space. The pin gear 110 protrudes from an inner circumferential surface of the mounting space to be formed along the inner circumferential surface. The pin gear 110 may be integrally formed with the case 100 upon formation of the case 100.

Conversely, as disclosed in Korean Patent Laid-open Publication No. 2010-0038146, the conventional pin gear 110 employs a roll-shaped pin fitted into the case 100 and fixed thereto one by one. Accordingly, since a processing error as well as assembly tolerance may be generated upon manufacturing due to an alternate production, requirements for high precision and high deceleration cannot be easily realized, thus causing malfunctions. However, according to one embodiment of the present invention, the pin gear 110 corresponding to the plate gear 300, having the epitrochoid tooth form, is integrally formed with the case 100 during a forming step of the case 100, and thus assembly errors as well as processing errors can be minimized, and manufacturing costs can be reduced.

An input gear 200 may be mounted in the mounting space of the case 100, and can be connected to a motor through a lower end (or an input side with reference to FIG. 5) of the case 100. The transmission gear 170, described above, is engaged with the input gear 200 to transmit power to the input gear 200. That is, the driving gear and the input gear 200 are meshed with each other in a spur gear-type of a helical gear-type, and the rotary shaft of the driving gear and the rotary shaft of the input gear are disposed in parallel. However, alternatively, the input gear 200 may be directly connected to the rotary shaft of the motor, or may be engaged with the driving gear in a bevel gear-type.

First and second eccentric shafts S1 and S2 sequentially protrude from the input gear 200 toward the outside, wherein the first eccentric shaft S1 is disposed closer to the input gear 200 than the second eccentric shaft S2. The first and second eccentric shafts are eccentric from a rotational center of the input gear 200. Eccentric directions thereof are opposite, but eccentric amounts thereof are substantially the same. The first and second eccentric shafts S1 and S2 are connected to the input gear 200 through a central shaft 210.

Figure 7:
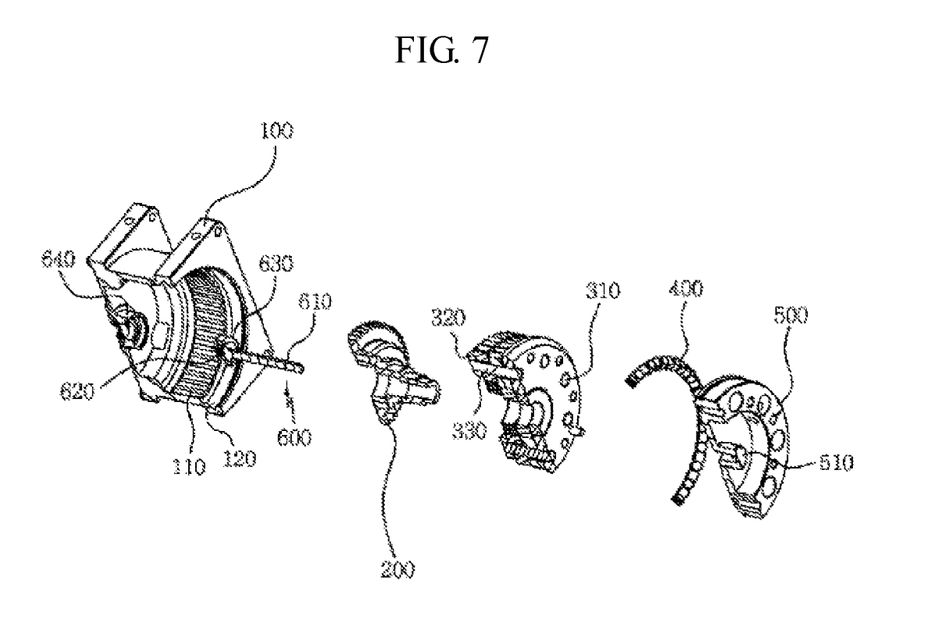
FIG. 7 is an exploded perspective view showing a cross-section of the secondary deceleration module shown in FIG. 5.

First and second plate gears 302 and 304 have a circular disk shape with the same size, and have the epitrochoid tooth form. The first and second plate gears 302 and 304 are adhered to each other and have a plurality of plate holes 310 formed therearound. As shown in FIG. 7, the first and second plate gears 302 and 304 are fastened to each other through a fixing pin 330 inserted into the plate hole 310 to transmit power to an output member 500.

The first plate gear 302 is rotatably installed at the first eccentric shaft S1, and the second plate gear 304 is rotatably installed at the second eccentric shaft S2. The first and second plate gears 302 and 304 are disposed to be eccentric from each other and rotated according to rotation of the first and second eccentric shafts S1 and S2 while coming in contact with the pin gear 110, but decelerated according to a difference in number of teeth of the first and second plate gears 302 and 304 and the pin gear 110.

Since the pin gear 110 has one more tooth than the plate gear 300, the plate gear 300 is decelerated at a deceleration ratio of "1/n" (i.e., n=the number of teeth of the plate gear 300) of the revolution number of the input gear 200 and rotated. For example, when the number of teeth of the plate gear 300 is 50, the number of teeth of the pin gear 110 is 51, and the plate gear 300 has a deceleration ratio of 1/50.

Meanwhile, when the power is transmitted to the output member 500 in a state in which the first and second plate gears 302 and 304 are eccentric in opposite directions, vibrations generated through the first and second plate gears 302 and 304 can be offset, and engagement with the pin gear 110 can be strengthened twofold. In addition, the output member 500 has a fastening hole 520, and a fastening pin 340 protruding from one side of the plate gear 300 is inserted into the fastening hole 520 to fasten the first and second plate gears 302 and 304 and the output member 500.

Figure 8:
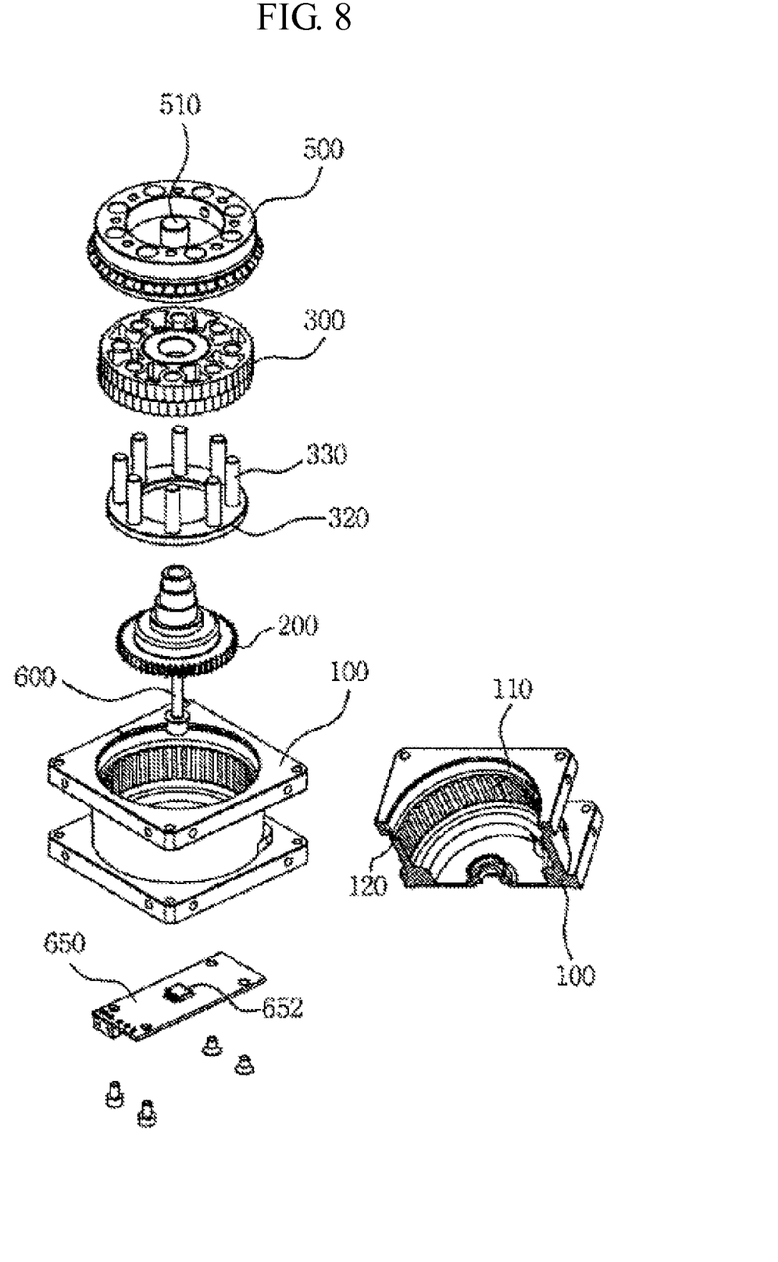
FIG. 8 is an exploded perspective view showing the secondary deceleration module and a position detector shown in FIG. 5.

As shown in FIGS. 7 and 8, the case 100 has a bearing groove 120 recessed along the inner circumferential surface, and the bearing groove 120 is disposed at an output side of the pin gear 110. A cross roller bearing 400 is installed at an output side of the plate gear 300, and the output member 500 is installed at an output side of the cross roller bearing 400. A portion of the cross roller bearing 400 is inserted into the bearing groove 120, and the remaining portion is inserted into a groove (not shown) recessed from a lower surface (cf. FIG. 5) of the output member 500. The output member 500 can be smoothly rotated in a state supported by the cross roller bearing 400. While the embodiment exemplarily describes the cross roller bearing 400, the cross roller bearing 400 may be replaced with another bearing.

In related art, a bearing housing (not shown) including the cross roller bearing 400 is separately fixed to an outer surface of the output side of the case 100. However, according to one embodiment described herein, an outer wheel of the cross roller bearing 400 may be integrally formed with the case 100, and thus the cross roller bearing 400 may be integrally formed with the case 100 to minimize assembly errors or processing errors.

In particular, since there is no need to separately fix the bearing housing, like the related art, a subsidiary fixing bolt can be omitted to reduce costs, and a precisely performed centering operation can be omitted from assembly to improve precision and productivity. Further, the volume and weight thereof can be minimized to implement a lightweight and compact module.

The output member 500 has a circular flange shape, which can be freely and easily connected to output power. The output member 500 has an output shaft 510 installed at a center thereof As shown in FIGS. 7 and 8, the secondary deceleration module further includes a position detector 600 configured to detect rotation of the output member 500. The position detector 600 may be an encoder configured to detect a revolution number in a rotational direction of the output member 500 to detect a position of the output member 500 (or the output shaft 510), which may be a magnetic encoder serving as an absolute encoder. However, as described below, the position detector 600 may be replaced with a potentiometer or an optical rotary absolute encoder. The position detector 600 can convert the detected position information into an electrical signal to transmit the signal to a controller (not shown), and the controller can control an input value of the motor through feedback.

Figure 9:
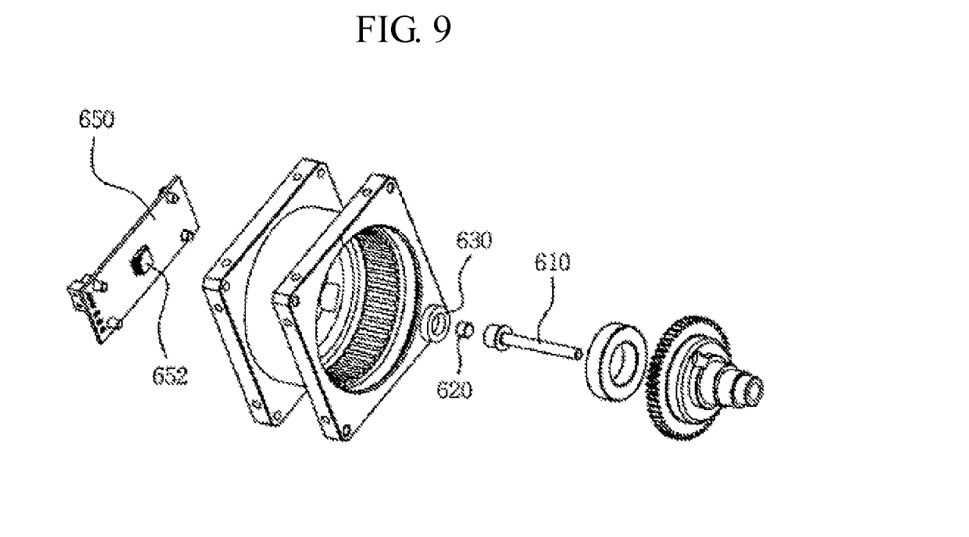
FIG. 9 is an exploded perspective view showing a rotary rod, a magnet, and a rod bearing shown in FIG. 8.

A rotary rod 610 sequentially passes through centers of the input gear 200, the first and second eccentric shafts S1 and S2, and the plate gear 300 to be fixed to the output shaft 510. A magnet 620 is installed at an input side of the rotary rod 610. A rod housing 640 is installed at a center of the input side of the case 100, and a rod bearing 630 is inserted into the rod housing 640 to support the rotary rod 610 in which the magnet 620 is installed.

A printed circuit board 650 is spaced apart from the magnet 620, and a position sensor 652 serving as a magnetic encoder is mounted in the printed circuit board 650. The position sensor 652 is disposed over an opening (not shown) of the rod housing 640 to detect a variation in magnetic flux density upon rotation of the magnet 620 to detect a position of the rotary rod 610.

As described above, the power input through the transmission gear 170 is decelerated at a certain deceleration ratio through the secondary deceleration module to be output through the output member 500, and the position detector 600 feeds the position information of the output member 500 back to the controller so that the controller can precisely control rotation of the output member 500.

Figure 10:
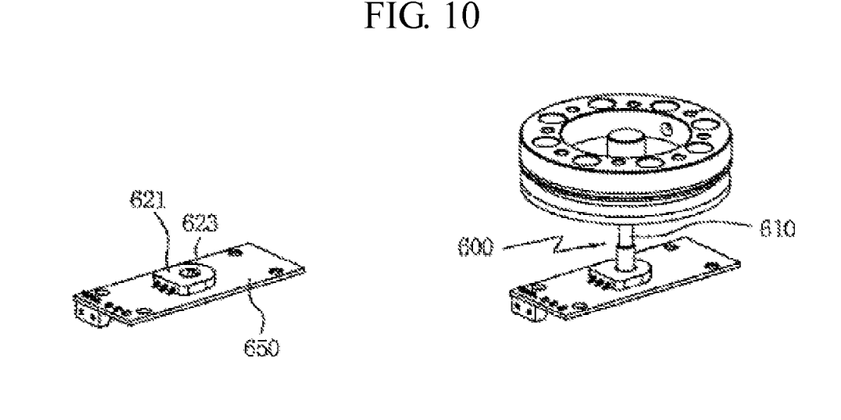
FIG. 10 is a perspective view schematically showing a position detector according to another embodiment of the present invention.

As shown in FIG. 10, the encoder includes a mounting section 621 and a rotor 623, the mounting section 621 is mounted on the printed circuit board 650 and the rotor 623 is rotatably installed at the mounting section 621. A lower end of the rotary rod 610 is coupled to the rotor 623, and the encoder detects rotation of the rotary rod 610 to feed the rotation back to the controller. The encoder may be a potentiometer or an optical rotary absolute encoder.

The above-mentioned position detector 600 may be applied to another type of secondary deceleration module. That is, the pin gear 110 may be installed in a mounting space separated from the case 100, and the bearing housing (not shown) including the cross roller bearing 400 may be installed separately from the case 100.

It will be apparent to those skilled in the art that various modifications can be made to the above-described exemplary embodiments without departing from the spirit or scope of the invention. Thus, it is intended that the disclosure covers all such modifications provided they reside within the scope of the appended claims and their equivalents.

The present invention may be applied to various actuators including a robot.

What is claimed is:

1. A separable actuator for controlling an articulated motion of a robot, comprising a primary deceleration module,
   the primary deceleration module comprising,
      a first printed circuit board to feed back output of a driving motor,
      a secondary deceleration module to control the driving motor,
      one or more primary deceleration gears rotated by the driving motor, and
      a housing in which the driving motor, the first printed circuit board, and the one or more primary deceleration gears are mounted,
   wherein the secondary deceleration module is meshed with the primary deceleration module to receive and output power, the secondary deceleration module comprising,
      one or more secondary deceleration gears meshed and rotated with the one or more primary deceleration gears, the one or more secondary deceleration gears comprising a plurality of pin gears protruding from an inner circumferential surface of a mounting space of the case to be formed along the inner circumferential surface, an input gear meshed and rotated with the one or more primary deceleration gears, and a first eccentric shaft and a second eccentric shaft eccentric from a rotational center of the input gear and sequentially protruding from the input gear, and
      a case in which the one or more secondary deceleration gears are mounted and connected to the housing.

2. The separable actuator according to claim 1, wherein the one or more primary deceleration gears comprise:
   a driving gear fixed to a rotary shaft of the driving motor;
   a driven gear meshed with the driving gear; and
   a transmission gear installed on the same shaft of the driven gear to be rotated with the driven gear and meshed with the one or more secondary deceleration gears.

3. The separable actuator according to claim 1, wherein the secondary deceleration module is a gear-type decelerator having an involute tooth form, a rolling type decelerator, a harmonic drive decelerator, or a cycloid decelerator.

4. The separable actuator according to claim 1, wherein the secondary deceleration module further comprises a position detector to detect the output, convert the output into an electrical signal, and transmit the electrical signal; and
   the position detector is a magnetic absolute encoder, a potentiometer, or an optical rotary absolute encoder.

5. The separable actuator according to claim 1, wherein the housing and the case have a plurality of bolt holes formed at preset intervals; and
   the bolt holes form a rectangular shape to form a unit lattice.

6. The separable actuator according to claim 5, further comprising one or more positioning pins inserted into the bolt holes to fasten the housing and the case.

7. The separable actuator according to claim 1, wherein the one or more secondary deceleration gears further comprise
   a plate gear comprising a first plate gear and a second plate gear, the first and the second plate gears installed on the first and second eccentric shafts and to come in contact with the pin gears to be rotated therewith according to rotation of the first and second eccentric shafts, respectively,
   wherein an output member is fixed to the plate gear and rotated with the plate gear.

8. The separable actuator according to claim 7, further comprising a position detector to detect rotation of the output member and convert the detected result into an electrical signal to transmit the electrical signal,
   wherein the position detector is a magnetic absolute encoder, a potentiometer, or an optical rotary absolute encoder.

9. The separable actuator according to claim 8, wherein the position detector comprises:
   a rotary rod sequentially passing through the input gear, the first and second eccentric shafts, and the first and second plate gears, and having one end fixed to an output shaft installed at a center of the output member to be rotated with the output shaft;
   a magnet fixed to the other end of the rotary rod; and
   a second printed circuit board spaced apart from the magnet and in which a magnetic encoder to detect rotation of the magnet is mounted.

10. The separable actuator according to claim 9, wherein the position detector further comprises:
    a rod housing installed at a center of an input side of the case; and
    a bearing inserted into the rod housing to support the rotary rod.

11. The separable actuator according to claim 8, wherein the position detector comprises:
    a rotary rod sequentially passing through the input gear, the first and second eccentric shafts, and the first and second plate gears, and having one end fixed to an output shaft installed at a center of the output member and rotated with the output shaft;
    a printed circuit board spaced apart from the rotary rod; and
    an encoder mounted in the printed circuit board and coupled to a lower end of the rotary rod, and to detect rotation of the rotary rod.

12. The separable actuator according to claim 7, wherein the first and second eccentric shafts are eccentric in opposite directions.

13. The separable actuator according to claim 7, wherein the number of teeth of the pin gears is larger than that of the first and second plate gears.

14. The separable actuator according to claim 7, wherein the case further has a bearing groove recessed along the inner circumferential surface and disposed at an output side of the pin gears; and
    the secondary deceleration module further comprises a bearing inserted into the bearing groove to support the output member.

* * * * *